UNITED STATES PATENT OFFICE.

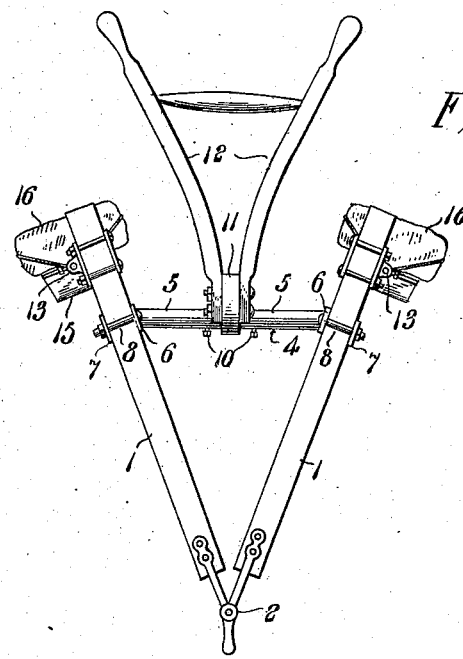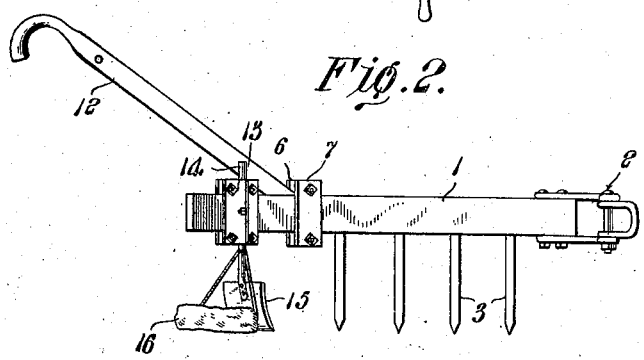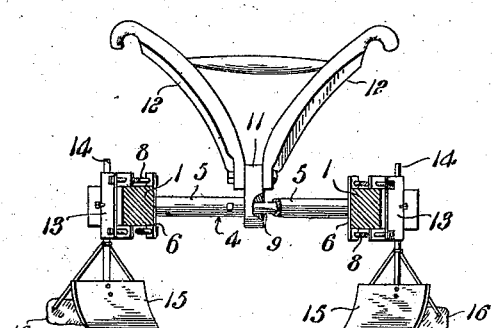

JOHNATHAN W. FARRINGTON, OF ALBA, TEXAS.

PLOW.

No. 881,391. Specification of Letters Patent. Patented March 10, 1908.

Application filed February 1, 1907. Serial No. 355,300.

*To all whom it may concern:*

Be it known that I, JOHNATHAN W. FARRINGTON, a citizen of the United States, residing at Alba, in the county of Wood and State of Texas, have invented a new and useful Plow, of which the following is a specification.

This invention has relation to plows or harrows and it consists in the novel construction and arrangement of its parts as hereinafter shown and described.

The object of the invention is to provide an implement of the character indicated which is of the straddle row type and consequently is adapted to work both sides of the row simultaneously.

The implement consists primarily of a pair of beams pivoted together at their forward ends and which are secured together at their rear portions by a cross member which may be adjusted longitudinally of the beam for increasing or decreasing the angle existing between the beams. Handles are attached to the cross member and provision is made whereby the said handles may be swung vertically and secured in elevated or lowered positions. The said beams are provided with teeth or other earth engaging members to one of which is attached a bag filled with sand or similar material which trails upon the ground and is adapted to roll and kill insects. The said cross member may be treated with a compound such as iodoform, carbolic acid and creosote or the like which compound is mixed in crude coal oil or cotton seed oil or some cheap body and deposited upon the branches of the plants as the implement is drawn along the row and which is adapted to destroy insects and prevent the same from gathering upon the plant.

In the accompanying drawing:—Figure 1 is a top plan view of the plow, and Fig. 2 is a side elevation of the same. Fig. 3 is a rear elevation of same.

The implement comprises the beams 1, 1 which are pivoted together at their forward ends as at 2 and which are provided with teeth 3 or other earth engaging members. The cross member 4 is attached at its end portions to the rear portions of the beams 1, 1. Said cross member is made up of sections and may be adjusted longitudinally of the beams 1 for the purpose of increasing or decreasing the angle existing between the said beams. The said cross member consists of the sleeves 5 which are provided at their ends with the plates 6. The plates 7 bear against the outer sides of the beams 1 and the bolts 8 are located above and below with said beams 1 and secure the plates 6 and 7 together. The said plates 6 and 7 and the bolts 8 constitute clamps for gripping the beams 1 and obviously may be adjusted longitudinally of the said beam. The rod 9 fits within the inner ends of the sleeves 5 and is secured therein by the set screws 10. Said rod is provided at its middle with a lug 11, the sides of which are attached to the lower ends of the handles 12. It will thus be seen that by loosening the set screws 10 that the handles 12 may be swung in a vertical plane and secured at a desired height for operating the implement to advantage and with ease. The sleeve 13 is attached to the beam 1 and the standard 14 passes through the said sleeve 14 and may be adjusted vertically therein. The plate 15 is attached to the lower end of the standard portion and the bag 16 is attached to said plate. The bag 16 is filled with sand or other similar granular material. An insect destroying compound such for instance as iodoform, carbolic acid and creosote may be smeared upon the cross member 4 and as the implement passes along the row of plants the upper branches of the plants will come in contact with the cross member 4 and wipe some of the compound from the same. The said compound will destroy insects and prevent the same from accumulating upon the plants. Also the plate 15 will work the surface of the soil and the bag 16 trailing behind the said plate will roll and destroy insects that might be at or near the surface of the ground.

Having described my invention what I claim as new and desire to secure by Letters-Patent is:—

A plow comprising beams pivoted together at their forward ends, a cross member connecting the rear portions of the beams together, said member consisting of binate sleeves each having a clamping means which surrounds a beam and is adapted to be adjusted longitudinally thereof, a rod fitting in said sleeves and terminating short of the clamping means and adapted to turn therein, handles fixed to the rod and means carried by the sleeves for fixing the rod with relation thereto.

In testimony that I claim the foregoing as my own, I have hereto affixed my signature in the presence of two witnesses.

JOHNATHAN W. FARRINGTON.

Witnesses:
WILL CROVER,
R. E. BOZEMAN.